United States Patent
Son et al.

(10) Patent No.: US 8,019,820 B2
(45) Date of Patent: Sep. 13, 2011

(54) SERVICE GATEWAY DECOMPOSITION IN A NETWORK ENVIRONMENT INCLUDING IMS

(75) Inventors: Giyeong Son, Mississauga (CA); Allan D. Lewis, New Dundee (CA); Bruno R. Preiss, Waterloo (CA)

(73) Assignee: Research In Motion Limited, Waterloo (CA)

( * ) Notice: Subject to any disclaimer, the term of this patent is extended or adjusted under 35 U.S.C. 154(b) by 170 days.

(21) Appl. No.: 11/769,443

(22) Filed: Jun. 27, 2007

(65) Prior Publication Data

US 2009/0006562 A1 Jan. 1, 2009

(51) Int. Cl.
*G06F 15/16* (2006.01)

(52) U.S. Cl. ...................................................... 709/206

(58) Field of Classification Search .................. 709/204, 709/206, 227
See application file for complete search history.

(56) References Cited

U.S. PATENT DOCUMENTS

| | | | |
|---|---|---|---|
| 6,229,787 B1 | 5/2001 | Byrne | |
| 6,502,131 B1 * | 12/2002 | Vaid et al. | ...................... 709/224 |
| 6,515,985 B2 | 2/2003 | Shmulevich | |
| 6,754,180 B1 | 6/2004 | Christie | |
| 6,799,210 B1 | 9/2004 | Gentry | |
| 6,965,925 B1 | 11/2005 | Shank | |
| 7,010,002 B2 | 3/2006 | Chow | |
| 7,068,644 B1 | 6/2006 | McConnell | |
| 7,194,761 B1 * | 3/2007 | Champagne | ...................... 726/6 |
| 7,571,206 B2 | 8/2009 | Koning | |
| 7,634,577 B1 | 12/2009 | Grabelsky et al. | |
| 2001/0034791 A1 * | 10/2001 | Clubb et al. | ................... 709/238 |
| 2002/0049818 A1 | 4/2002 | Gilhuly et al. | |
| 2002/0132609 A1 | 9/2002 | Lewis | |
| 2005/0002405 A1 | 1/2005 | Gao | |
| 2005/0249196 A1 | 11/2005 | Ansari | |
| 2006/0052087 A1 | 3/2006 | Tuunanen | |
| 2006/0092970 A1 | 5/2006 | Song et al. | |
| 2006/0217133 A1 * | 9/2006 | Christenson et al. | ......... 455/461 |
| 2006/0229093 A1 * | 10/2006 | Bhutiani et al. | .............. 455/518 |
| 2006/0230154 A1 | 10/2006 | Nguyenphu | |
| 2006/0239267 A1 | 10/2006 | Ryu | |
| 2006/0285537 A1 * | 12/2006 | Mahdi | .......................... 370/355 |
| 2007/0100981 A1 | 5/2007 | Adamczyk | |

(Continued)

FOREIGN PATENT DOCUMENTS

EP 1 788 764 A1 5/2007

OTHER PUBLICATIONS

European Search Report; European Patent Office; Dec. 21, 2007; 8 pages.

(Continued)

*Primary Examiner* — Wing Chan
*Assistant Examiner* — Andrew Woo
(74) *Attorney, Agent, or Firm* — The Danamraj Law Group, P.C.

(57) ABSTRACT

In one embodiment, a scheme is described with respect to a service network system adapted to interoperate in an Internet Protocol (IP) Multimedia Subsystem (IMS) environment wherein signaling and message media planes are decoupled. The service network system comprises a service gateway controller (SGC) that is decomposed from a plurality of a plurality of service gateways (SGWs) operable to effectuate a message transport interface with respect to a remote services server.

14 Claims, 11 Drawing Sheets

U.S. PATENT DOCUMENTS

2010/0067437 A1   3/2010   Vikberg et al.

OTHER PUBLICATIONS

European Search Report; European Patent Office; Jan. 8, 2008; 9 pages.

European Search Report; European Patent Office; Nov. 30, 2007; 9 pages.

3rd Generation Partnership Project; Technical Specification Group Services and System Aspects; IP Multimedia Subsystem (IMS); Stage 2; Release 8; 3GPP TS 23.228 V8.1.0; Jun. 2007; 226 pages.

EPO Communication Examination Report, Application No. 07 111 182.7, dated May 20, 2010, 6 pgs.

US Office Action, U.S. Appl. No. 11/769,495, US Patent and Trademark Office, Nov. 26, 2010, 4 pgs.

US Office Action, U.S. Appl. No. 11/769,377, US Patent and Trademark Office, May 25, 2010, 12 pgs.

US Office Action, U.S. Appl. No. 11/769,495, US Patent and Trademark Office, Dec. 3, 2009, 11 pgs.

US Office Action, U.S. Appl. No. 11/769,495, US Patent and Trademark Office, Apr. 12, 2010, 11 pgs.

US Office Action, U.S. Appl. No. 11/769,495, US Patent and Trademark Office, Jun. 11, 2009, 11 pgs.

US Office Action, U.S. Appl. No. 11/769,377, USPTO, Dec. 27, 2010, 14 pgs.

US Office Action, U.S. Appl. No. 11/769,495, USPTO, Nov. 26, 2010, 5 pgs.

EP Communication Examination Report, Application No. 0711186.8, European Patent Office, May 27, 2008, 6 pgs.

CIPO, Office Action, Application No. 2,636,229, May 18, 2011, 6 pgs.

CIPO, Office Action, Application No. 2,636,230, May 17, 2011, 5 pgs.

EPO, Communication Pursuant to Article 94(3) EPC, Application No. 07111182.7, Aug. 27, 2008, 6 pgs.

USPTO, Office Action, U.S. Appl. No. 11/769,377, Dec. 27, 2010, 14 pgs.

USPTO, Office Action, U.S. Appl. No. 11/769,495, Apr. 25, 2011, 11 pgs.

* cited by examiner

SERVICE GATEWAY DECOMPOSITION IN A NETWORK ENVIRONMENT INCLUDING IMS

REFERENCE TO RELATED APPLICATION(S)

This application discloses subject matter that is related to the subject matter of the following U.S. patent application(s): (i) "ARCHITECTURE FOR SERVICE DELIVERY IN A NETWORK ENVIRONMENT INCLUDING IMS", application Ser. No.: 11/739,377, filed even date herewith, in the name(s) of Giyeong Son, Allan D. Lewis and Bruno Preiss; (ii) "SIGNALING ARCHITECTURE FOR DECOMPOSED SERVICE NETWORK ELEMENTS OPERABLE WITH IMS", application Ser. No.: 11/769,495, filed even date herewith, in the name(s) of Giyeong Son, Allan D. Lewis and Bruno Preiss; (iii) "SCALABLE AND SECURE MESSAGING SYSTEM FOR A WIRELESS NETWORK," now published as U.S. Patent Application Publication No. 2002/0132609, in the names of: Allan D. Lewis, Tabitha K. Ferguson, James A. Godfrey, Carl L. Cherry and Bill Yuan; and (iv) "SYSTEM AND METHOD FOR PUSHING INFORMATION FROM A HOST SYSTEM TO A MOBILE DATA COMMUNICATION DEVICE," now published as U.S. Patent Application Publication No. 2004/0073619, in the names of: Barry J. Gilhuly, Anh Ngoc Van, Steven M. Rahn, Gary P. Mousseau and Mihal Lazaridis. Each of the foregoing patent applications is incorporated by reference herein.

FIELD OF THE DISCLOSURE

The present patent disclosure generally relates to communications networks. More particularly, and not by way of any limitation, the present patent disclosure is directed to an architecture for service delivery in a network environment including an IP Multimedia Subsystem (IMS) network.

BACKGROUND

Delivery of email messages to mobile handheld devices is well known. However, current techniques for achieving such delivery are generally not concerned with the latest $3^{rd}$ Generation Partnership Project (3GPP) standards that specify a new, all IP-based network architecture referred to as the IP Multimedia Subsystem (IMS).

Although IMS provides a well-defined architecture with respect to session control and the underlying network infrastructure, it is silent regarding the service architecture inasmuch as service providers are responsible for architecting their services over the IMS network. One of the issues is ensuring reliability and scalability of the service architecture with respect to the services to be delivered over the IMS network.

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION OF THE DRAWINGS

The present patent disclosure is broadly directed to a network architecture and associated systems and methods for facilitating delivery of redirected data items over a communications network to a mobile communications device, wherein the communications network includes an IMS network. In one embodiment, disclosed herein is a service network system adapted to interoperate in an IMS environment. The claimed embodiment comprises one or more of the following: a service gateway controller (SGC) operable to effectuate a signaling interface with respect to at least one remote services server; and a plurality of service gateways (SGWs) operably coupled to the SGC, the plurality of SGWs for effectuating a message transport interface with respect to the at least one remote services server, wherein each of the plurality of SGWs is configurable to be connected to the remote services server in a dynamic routing arrangement.

In another embodiment, disclosed herein is a method of communication comprising one or more of the following features: contacting a network node such as SGC disposed in an IMS network by a service client (SC) executing on a user equipment (UE) device, wherein the SGC is operably coupled to a plurality of SGWs; discovering a particular SGW assigned to the SC on the UE device; and receiving from the particular SGW one or more data items redirected to the UE device by a remote services server associated therewith.

In a still further embodiment, disclosed herein is a wireless UE device, comprising one or more of the following features: means for contacting a network node such as SGC disposed in an IMS network by a service client (SC) executing on the wireless UE device, wherein the SGC is operably coupled to a plurality of SGWs; means for discovering a particular SGW assigned to the SC on the wireless UE device; and means for receiving from the particular SGW one or more data items redirected to the wireless UE device by a remote services server associated therewith.

Figure 1:
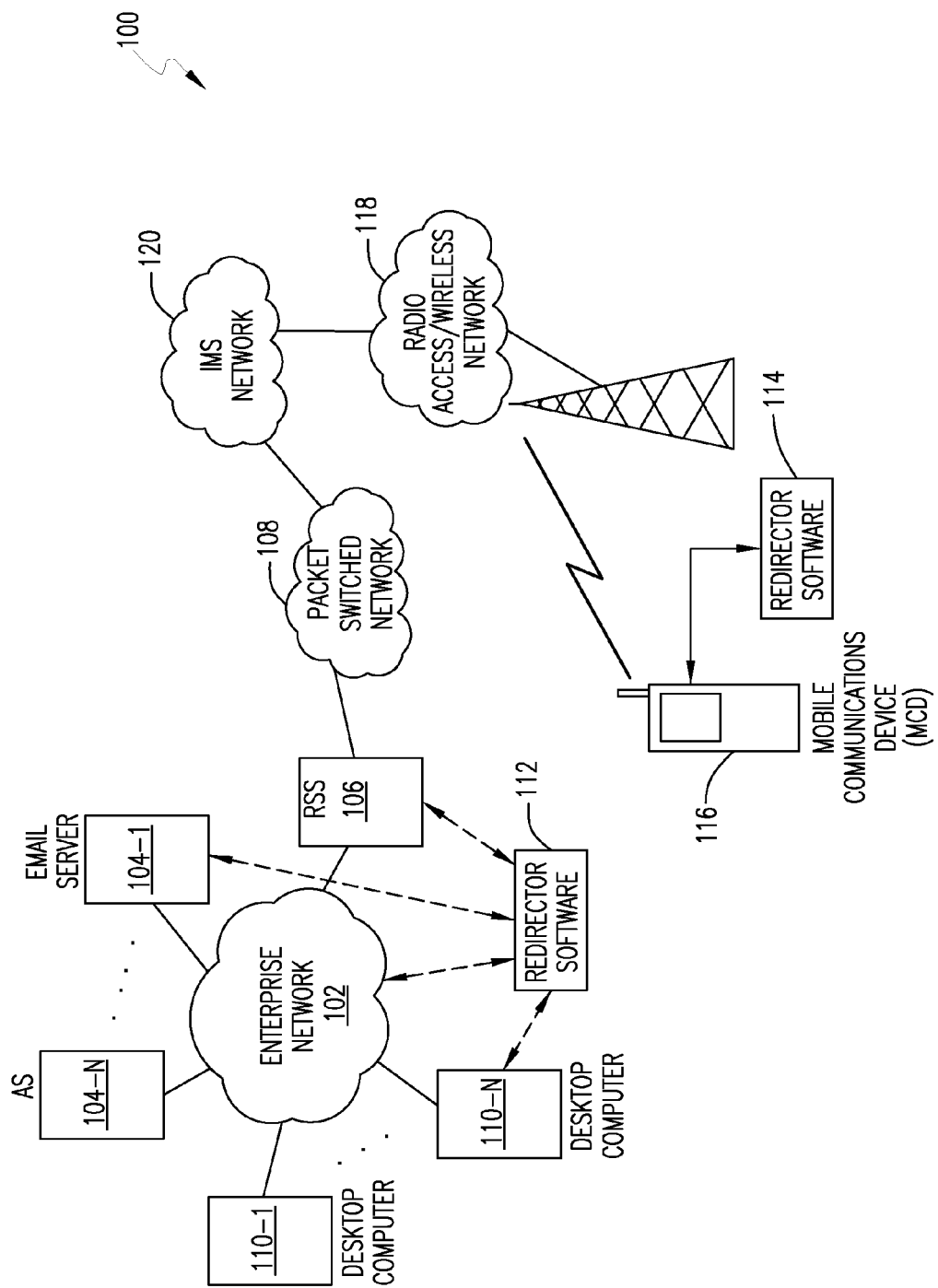
FIG. 1 depicts a network communications environment including an enterprise network and IP Multimedia Subsystem (IMS) infrastructure wherein one or more embodiments of the present patent disclosure may be practiced.

A system and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale. Referring to the drawings, and more particularly to FIG. 1, depicted therein is an exemplary network communications environment 100 including an enterprise network 102 and an IMS network 120 wherein one or more embodiments of the present patent disclosure may be practiced for purposes of facilitating delivery of data items to and from a mobile communications device 116. The enterprise network 102, which may be a packet-switched network, can include one or more geographic sites and be organized as a local area network (LAN), wide area network (WAN) or metropolitan area network (MAN), et cetera, for serving a plurality of corporate users. A number of application servers 104-1 to 104-N disposed as part of the enterprise network 102 are operable to provide or effectuate a host of internal and external services such as email, video mail, Internet access, corporate data access, messaging, calendaring and scheduling, information management, and the like. For instance, reference numeral 104-1 refers to a corporate email messaging system/server. A diverse array of personal information appliances such as desktop computers (e.g., computers 110-1 through 110-N), laptop computers, palmtop computers, et cetera, although not specifically shown in FIG. 1, may be operably networked to one or more of the application servers 104-$i$, $i=1, 2, \ldots, N$, with respect to the services supported in the enterprise network 102.

Additionally, a remote services server (RSS) 106 may be interfaced with the enterprise network 102 for enabling a corporate user to access or effectuate any of the services from a remote location using the mobile communications device (MCD) 116. To facilitate redirection or replication of data items from an enterprise site (e.g., from a desktop computer, a user mailbox, or some other location) to MCD 116 for a particular user, specialized software 112 may be provided that may be executed on the email server 104-1, on RSS 106, on a desktop computer, or as a separate application server in the enterprise network 102. Regardless of how such software is provisioned within the enterprise network 102, a client software component 114 is operable to be executed on MCD 116 to which user-selectable data items may be redirected.

RSS 106 may be coupled via a public packet-switched network 108 (e.g., the Internet) to the IMS core network 120 that provides a delivery mechanism with respect to the data items that are processed to be redirected to MCD 116. In one embodiment, MCD 116 may be operably connected to the IMS network 120 via a suitable access network infrastructure 118. As will be described in detail below, the IMS network 120 includes suitable service gateway functionality as an IMS service node (i.e., application server) operable to transmit the processed data items or portions thereof to MCD 116.

In general, a variety of data items may be processed to be redirected over the IMS network. By way of example, the data items may comprise email messages, calendar events, meeting notifications, address or other personal data assistant (PDA) entries, journal entries, personal reminders, Instant Messages (IM), multimedia notifications/messages (e.g., audio and/or video clips), or other items from an external network (e.g., stock quotations, news stories, podcasts, webcasts, content downloads, etc. that are pushed or otherwise provided to users). In one embodiment, the data items to be redirected may be detected by way of a polling mechanism wherein specialized software such as software 112 may be configured to poll for certain data items (i.e., "pull" model) on behalf of a user authorized for receiving redirected data items at a wireless user equipment (UE) device such as MCD 116. In an alternative embodiment, a "push" model may be employed wherein the data items to be redirected may be detected based on receiving automatically generated notifications. Where the data items are stored in databases, changes to such databases (e.g., due to arrival of a new email, updating of an address book, etc.) may be automatically provided to software 112 (i.e., without it having to poll for the changes) via suitable advise requests such as those provided by Messaging Application Programming Interface (MAPI), for example. Additionally, regardless of whether a pull model or a push model is employed for detecting the data items, an event-driven scheme may also be provided such that redirection of a data item may be rendered dependent upon setting certain flags associated with user-selectable events (i.e., trigger events). That is, in other words, the redirection software 112 may be "turned on" or "turned off" based on whether a trigger event has occurred and, upon the occurrence of the event (which may generate a signal that operates to set a trigger flag), new data items may be continuously redirected (i.e., without further global gating conditions). These user-defined trigger events may include external events, internal events and networked events, or a combination thereof. Examples of external events include: receiving a message from the user's MCD to begin redirection; receiving a similar message from some external computer; sensing that the user is no longer in the vicinity of the user's computer system; or any other event that is external to the user's computer system. Internal events could be a calendar alarm, screen saver activation, keyboard timeout, programmable timer, or any other user-defined event that is internal to the computer system executing the redirection software 112. Networked events are user-defined messages that are transmitted from another computer coupled to the system executing the redirection software 112 via a network (e.g., a LAN) to initiate redirection. These are just some of the examples of the types of user-defined events that can trigger the redirector software 112 to initiate redirection of data items to the user's MCD. As a further implementation, a variety of filtering schemes may also be used for further modulating the redirection behavior regardless of whether the redirection software is disposed within the enterprise or at a standalone desktop computer or operable in association with an Internet email system. Accordingly, the functionality of the redirection software 112 may comprise one or more of the following: (1) configure and set up one or more user-defined trigger events (which may be user-specific, time-window-specific, etc.) that will start redirection; (2) configure the types of user data items for redirection and optionally configure a preferred list of message senders whose messages are to be redirected; (3) configure the type and capabilities of the user's handheld equipment (e.g., MCD 116); (4) receive messages and signals from data item repackaging systems and the event generating systems; and (5) command and control the redirection of the user-selected data items to the user's MCD the repackaging systems. Those skilled in the art will recognize that other functions and processes not specifically enumerated (e.g., processing of attachments, encryption, encoding/transcoding, compression, etc.) may also be integrated into or otherwise associated with the functionality of software 112.

Figure 2:
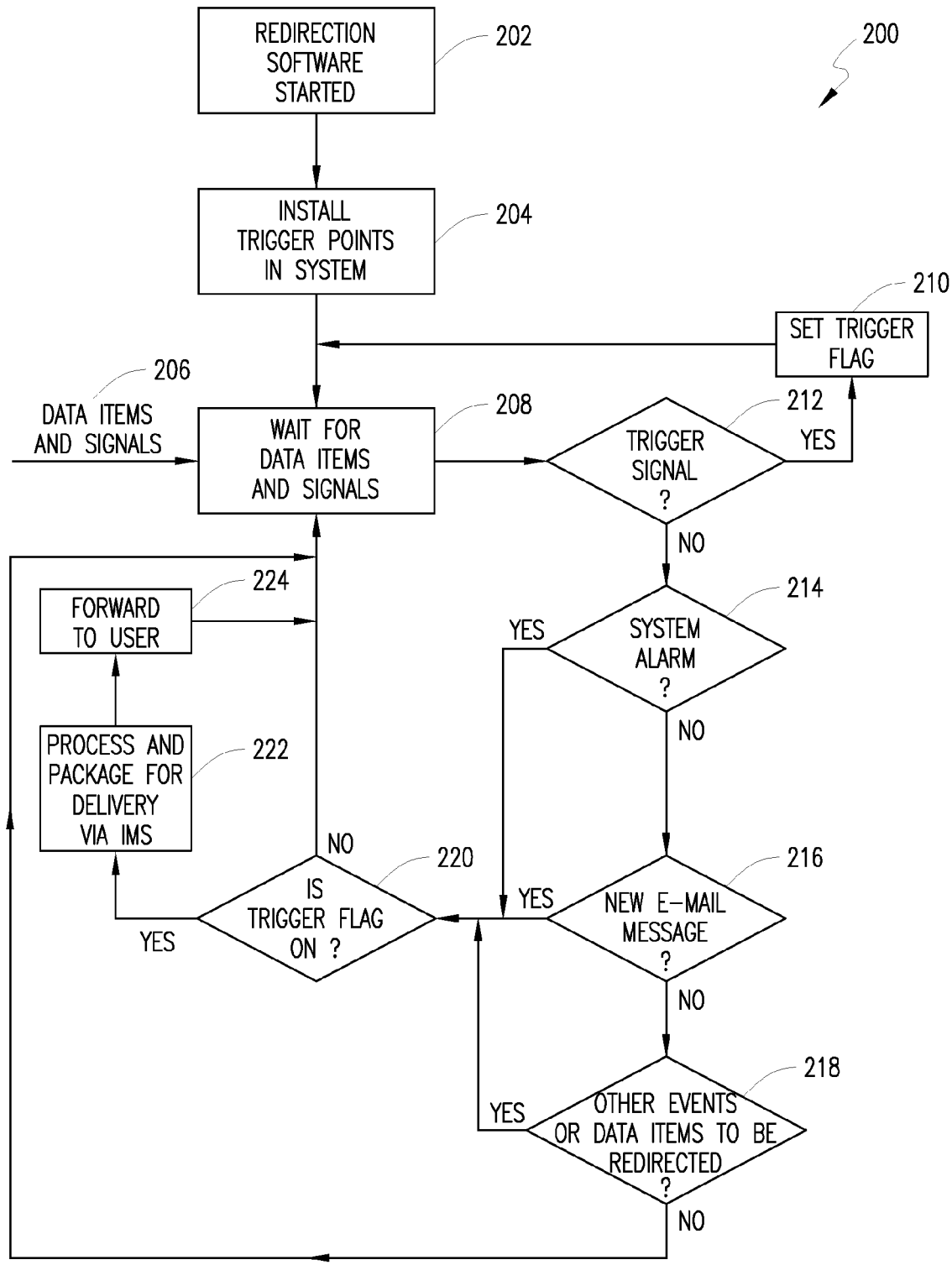
FIG. 2 depicts a flowchart associated with one or more exemplary embodiments of the present patent disclosure for facilitating delivery of data items over IMS.

FIG. 2 depicts a flowchart associated with an exemplary embodiment 200 of the present patent disclosure for facilitating delivery of data items over IMS based on a push model. As illustrated, redirector software 112, whose execution may be performed on different computers in a distributed computing environment, may be started and initially configured (blocks 202 and 204) to set up the redirection process for one or more users. As alluded to previously, the initial configuration of redirector software 112 may include: (1) defining the trigger events or trigger points for triggering redirection; (2) identifying one or more data item types for redirection; (3) selecting a repackaging sub-system, either standard email or a special-purpose technique; (4) selecting the type of mobile communications device, indicating whether and what type of attachments the device is capable of receiving and processing, and inputting an address of the mobile communications device; and (5) configuring one or more lists, e.g., a preferred list of user-selectable senders whose messages are to be redirected. If the redirection software 112 is executable on a network server, additional configuration steps may be necessary to enable redirection for a particular desktop system (e.g., desktop computer 110-1 associated with a particular user shown in FIG. 1), including: (1) setting up a profile for the desktop system indicating its address, events that will trigger redirection, and the data items that are to be redirected upon detecting an event; (2) maintaining a storage area at the server for the data items; and (3) storing the type of mobile communications device to which the desktop computer's data items are to be redirected, whether and what type of attachments the device is capable of receiving and processing, as well as an address of the mobile device. Once the redirector software is configured and the trigger points (or trigger events) are enabled (blocks 202 and 204), the redirector software is rendered into what may be referred to as "redirection mode," whereupon the software is operable to wait for data items and signals 206 such that redirection may commence if a new data item is available (block 208). A data item could be an email message or some other user data item that may have been selected for redirection, and a signal could be a trigger signal generated upon occurrence of a trigger event, or could be some other type of signal that has not been configured as an event trigger. When a message or signal is detected, the software is operable to determine (block 212) whether it is one of the trigger events that have been configured to signal redirection. If so, then at block 210 a trigger flag is set, indicating that subsequently detected data items that have been selected for redirection should be processed and packaged into processed information suitable for transmission to the user's MCD via IMS. If the signal 206 is not indicative of a trigger event, the software is operable to determine whether the data item is a system alarm (block 214), an email message (block 216), or some other type of information that has been selected for redirection (block 218). If the data item or signal is none of these three items, then control returns to block 208, where the redirector software continues to be in the redirection mode (i.e., waiting for additional messages, data items or signals 206 to act upon). If, however the message is one of these three types of information, then upon determining that the trigger flag has been set (block 220), the data item is indicated to be redirected to the MCD. If the trigger flag is set, the redirector software 112 causes a repackaging system (a standard email system or a TCP/IP-based system) to process and package the item for IMS delivery (block 222). At block 224, the processed/packaged data item is redirected to the user's MCD via IMS by directing the processed information to a suitable service gateway as will be described in detail hereinbelow. Control then returns to block 208 where the redirection software 112 continues to be in the redirection mode. Although not shown explicitly in FIG. 2, further determinations may be made after block 220 in order to verify whether any number of user-specific, sender-specific, data item-specific, time-window-specific filtering schemes are satisfied. Additional details regarding the redirection software functionality and further variations therein may be found in U.S. Pat. No. 6,219, 694 (issued: Apr. 17, 2001) entitled "SYSTEM AND METHOD FOR PUSHING INFORMATION FROM A HOST SYSTEM TO A MOBILE DATA COMMUNICATION DEVICE HAVING A SHARED ELECTRONIC ADDRESS" in the names of Mihal Lazaridis and Gary P. Mousseau, which is assigned to the assignee of the present patent application and incorporated by reference herein.

Figure 3A:
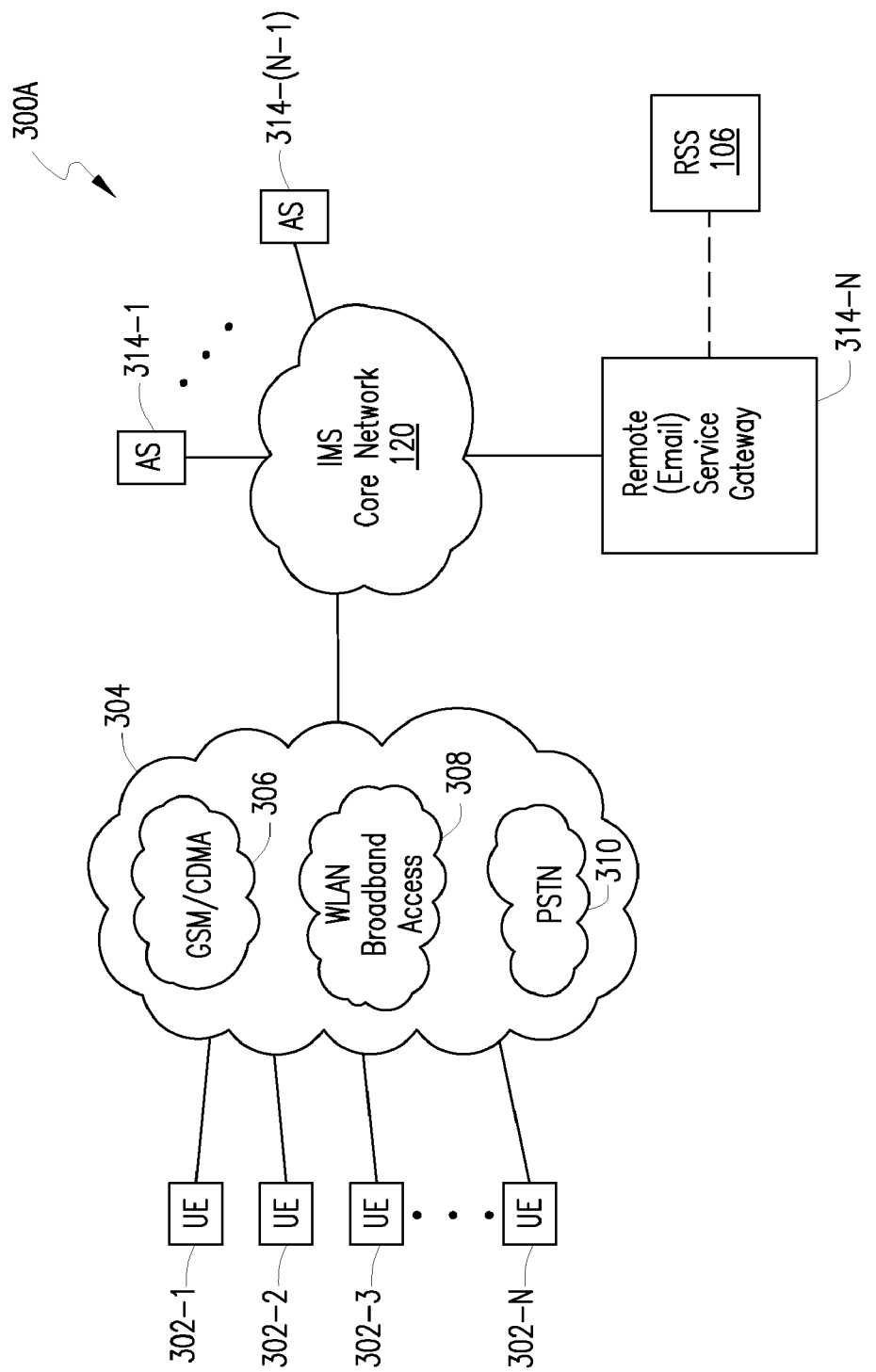
FIG. 3A depicts another view of a network communications environment where an IMS network and access networks are exemplified.

Referring now to FIG. 3A, depicted therein is another view of a network communications environment 300A where an IMS network and an access network space are exemplified for purposes of facilitating service delivery in accordance with the teachings of the present patent disclosure. As illustrated, the network communications environment 300A includes an access space 304 comprised of a number of access technologies available to a plurality of UE devices 302-1 through 302-N. For purposes of the present disclosure, a UE device may be any tethered or untethered communications device, and may include any mobile personal computer (e.g., laptops, palmtops, or handheld computing devices) equipped with a suitable wireless modem or a mobile communications device (e.g., cellular phones or data-enabled handheld devices capable of receiving and sending messages, web browsing, et cetera), or any enhanced PDA device or integrated information appliance capable of email, video mail, Internet access, corporate data access, messaging, calendaring and scheduling, information management, and the like. Preferably, the UE device is capable of operating in multiple modes in that it can engage in both circuit-switched (CS) as well as packet-switched (PS) communications, and can transition from one mode of communications to another mode of communications without loss of continuity and consume one or more IMS-based services. It will therefore be realized that any UE device 302-1 through 302-N may be deemed to be illustrative of MCD 116 shown in FIG. 1.

The access space 304 may be comprised of both CS and PS networks, which may involve wireless technologies, wireline technologies, broadband access technologies, etc. For example, reference numeral 306 refers to wireless technologies such as Global System for Mobile Communications (GSM) networks and Code Division Multiple Access (CDMA) networks, although it is envisaged that the teachings hereof may be extended to any $3^{rd}$ Generation Partnership Project (3GPP)-compliant cellular network (e.g., 3GPP or 3GPP2) as well. Reference numeral 308 refers to broadband access networks including wireless local area networks or WLANs, Wi-MAX networks as well as fixed networks such as DSL, cable broadband, etc. Thus, for purposes of the present disclosure, the access technologies may comprise radio access technologies selected from IEEE 802.11a technology, IEEE 802.11b technology, IEEE 802.11g technology, IEEE 802.11n technology, GSM/EDGE Radio Access Network (GERAN) technology (both CS and PS domains), and Universal Mobile Telecommunications System (UMTS) technology, and Evolution-Data Optimized (EVDO) technology, and so on. Additionally, also exemplified as part of the access space 304 is conventional wireline PSTN infrastructure 310 illustrated in FIG. 3A.

The access space 304, including any CS-based networks via suitable gateways, is coupled to the IMS core network 120. As is well known, the IMS core is operable according to the standards defined by the 3GPP and is designed to allow service providers manage a variety of services that can be delivered via IP over any network type, wherein IP is used to transport both bearer traffic and Session Initiation Protocol (SIP)-based signaling traffic. Broadly, IMS is a framework for managing the applications (i.e., services) and networks (i.e., access) that is capable of providing multimedia services. IMS defines an "application server" as a network element that delivers services subscribers use, e.g., voice call continuity (VCC), Push-To-Talk (PTT), etc. IMS manages applications by defining standardized interfaces and common control components that each application server (AS) is required to have, e.g., subscriber profiles, IMS mobility, network access, authentication, service authorization, charging and billing, inter-operator functions, and interoperation with the legacy phone network.

It should be understood that whereas IMS is defined by the 3GPP standards body which mainly addresses GSM networks, another group, 3GPP2, is involved in defining a closely analogous architecture referred to as Multimedia Domain (MMD). MMD is essentially an IMS for CDMA networks, and since MMD and IMS are roughly equivalent, the term "IMS" may be used in this present patent disclosure to refer collectively to both IMS and MMD where applicable. In addition, fixed network standards for NGN (Next Generation Networks) that are based on and/or reuse IMS are also being developed by bodies such as ETSI TISPAN, Cablelabs and the ITU-T. NGN and IMS are roughly equivalent, and accordingly the term "IMS" may also be used in this present patent disclosure to refer collectively to both IMS and NGN where applicable.

Continuing to refer to FIG. 3A, reference numerals 314-1 to 314-N refer to a plurality of AS nodes (also referred to as service gateways) operable to support various services, e.g., VCC, PTT, etc., alluded to hereinabove. Particularly, AS node 314-N embodies service gateway functionality that is operable to effectuate remote services delivery (e.g., delivery of redirected data items such as email messages, for instance) using the IMS infrastructure. Accordingly, AS node 314-N may be operably coupled to RSS 106 in an exemplary embodiment, which in turn may be disposed in an enterprise network as illustrated in FIG. 1.

Figure 3B:
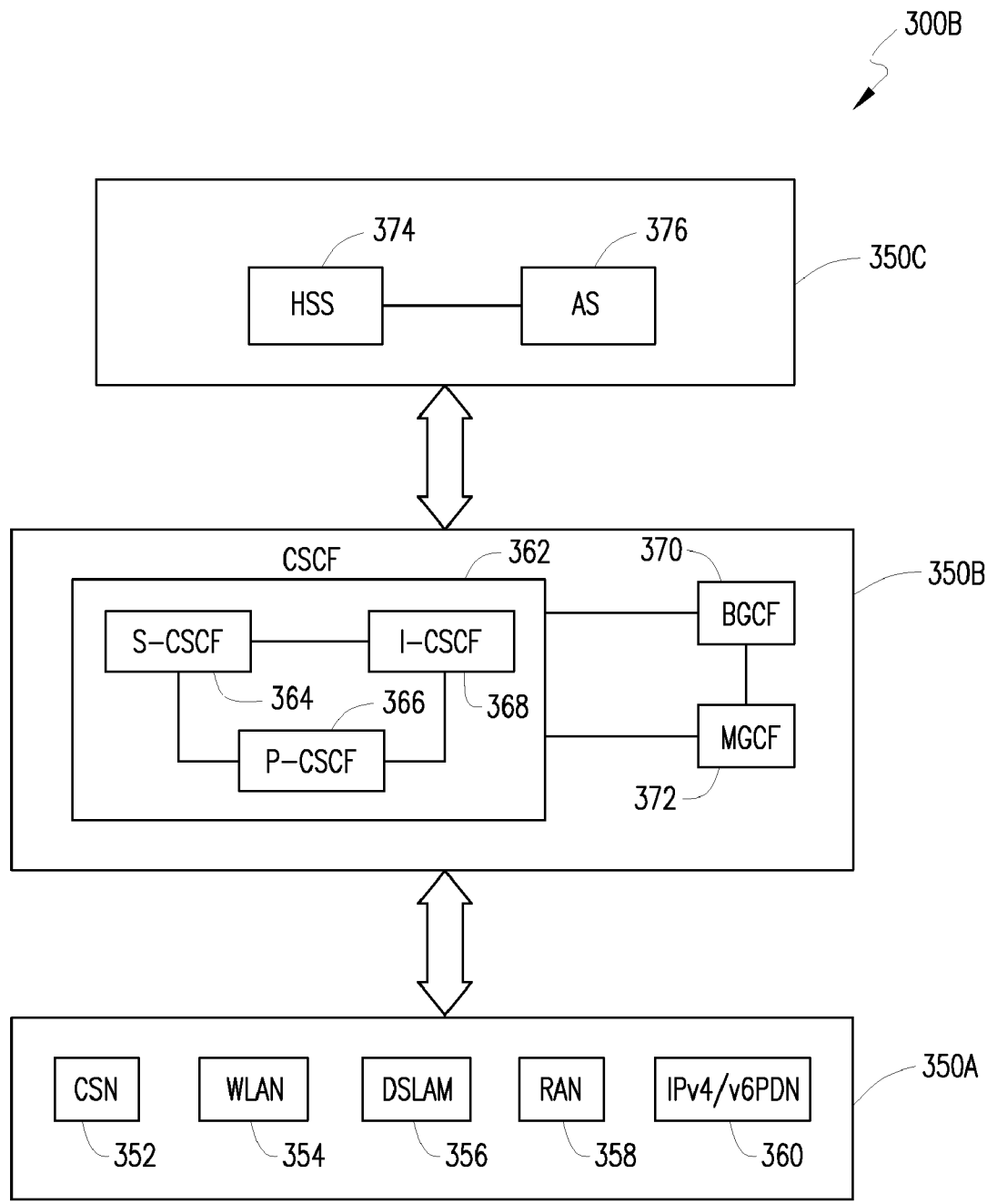
FIG. 3B depicts an architectural view of an IMS network operable for purposes of the present patent disclosure.

FIG. 3B depicts an architectural view 300B of an IMS environment such as the IMS core 120 operable for purposes of the present patent disclosure. As set forth above, the IMS core 120 is essentially a collection of different functions, linked by standardized interfaces, thereby forming one IMS administrative network. In general, a function is not necessarily a "node" (i.e., a hardware box). A service provider may implement one or more functions in a single node, or segregate a single function into more than one node. Further, each node may be present multiple times in a single network in order to achieve load balancing or other organizational objectives. Architecturally, the IMS environment involves a transport layer 350A, an IMS core layer 350B and a service/application layer 350C. The transport layer 350A comprises various access technologies as alluded to previously, e.g., circuit-switched network (CSN) technologies 352, WLAN technologies 354, DSLAM technologies 365, RAN technologies 358 and packet data network (PDN) technologies 360 based on IP version 4 or version 6. A number of SIP servers or proxies, collectively referred to as Call Session Control Function (CSCF) 362, are operable as part of the IMS core layer 350B for processing SIP signaling packets in the IMS. A Proxy-CSCF (P-CSCF) 366 is a SIP proxy that is usually the first contact point for an IMS-based device. P-CSCF 366 may be located either in a visited network (in full IMS networks) or in the subscriber's home network (when the visited network is not IMS-compliant). The IMS-aware MCD may discover its P-CSCF with either Dynamic Host Configuration Protocol (DHCP), or it may be assigned in a PDP context (e.g., in GPRS). A Serving-CSCF (S-CSCF) 364 is operable as a central node of the IMS signaling plane, and is usually located in the subscriber's home network. The functionality of S-CSCF 364 includes interfacing with a Home Subscriber Server (HSS) 374 in the service/application layer 350C to download and upload user profiles, policies, routing information relating to redirected data items, etc. An Interrogating-CSCF (I-CSCF) 368 is another SIP functionality at the edge of an administrative domain, which may be used for querying HSS 374 to retrieve the MCD location. In general, accordingly, the HSS database may contain user profiles (i.e., subscription-related information), including various user and device identifies such as International Mobile Subscriber Identity (IMSI), Temporary Mobile Subscriber Identity (TMSI), International Mobile Equipment Identity (IMEI), Mobile Subscriber ISDN Number (MSISDN), Universally Unique Identifier (UUID), as well as additional IMS-specific identities such as IP Multimedia Private Identity (IMPI) and IP Multimedia Public Identity (IMPU) that are implemented as Tel-Uniform Resource Identifiers (URIs) or SIP-URIs. Whereas the IMPI is unique to a particular user or device in a 3GPP, it is possible to have multiple Public Identities (i.e., IMPUs) per IMPI.

Furthermore, the IMS layer 350B may also include other functions that facilitate call routing relative to a CSN such as a PLMN. For instance, a Breakout Gateway Control Function (BGCF) 370 includes routing functionality based on E.164 phone numbers when communicating to a phone in the PLMN. A Media Gateway Controller Function (MGCF) 372 includes functionality for effectuating call control protocol conversion between SIP and ISDN User Part (ISUP).

Figure 4:
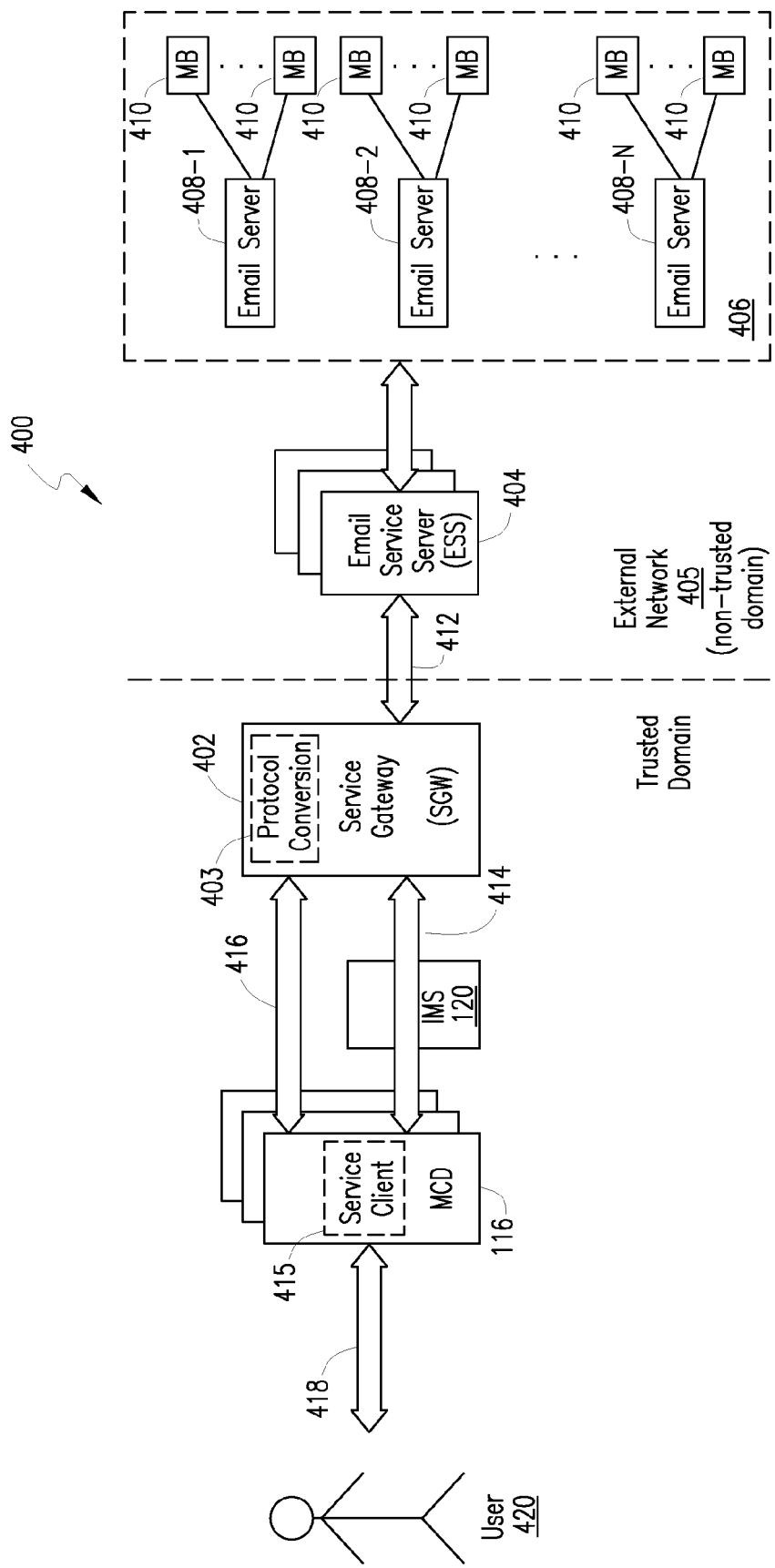
FIG. 4 depicts a network architectural embodiment for facilitating delivery of data items to a mobile communications device.

In addition to HSS 374, the service/application layer 350C includes one or more AS nodes, e.g., AS 376, with appropriate interfacing with the entities in the IMS layer 350B for effectuating services or applications. As pointed out previously, an AS node (i.e., service gateway) may be provided for effectuating delivery of redirected data items using the IMS infrastructure. FIG. 4 depicts a network architectural embodiment 400 that illustrates various entities, their logical elements and service flows for a formal model of providing email service delivery over IMS. A service gateway (SGW) 402 including a protocol translation/conversion functionality 403 is coupled to one or more email service server (ESS) entities 404 disposed in an external network 405 via an interface 412 that uses either standard or proprietary protocols. In turn, ESS entities 404, which may include the redirection software functionality described in the foregoing sections, are coupled to one or more mail messaging systems, e.g., messaging system 406 that may include a plurality of email servers 408-1 through 408-N. Each email server is operable to serve a number of user mailboxes MB 410. To facilitate scalability and reliability, the messaging system 406 may be architected as disclosed in the co-pending commonly assigned U.S. patent application Ser. No. 10/098,083 (filed: Mar. 14, 2002), entitled "SCALABLE AND SECURE MESSAGING SYSTEM FOR A WIRELESS NETWORK," now published as U.S. Patent Application Publication No. 2002/0132609, in the names of: Allan D. Lewis, Tabitha K. Ferguson, James A. Godfrey, Carl L. Cherry and Bill Yuan, incorporated by reference herein.

By way of example, the interface 412 may employ a proprietary protocol such as Email Transport Protocol (ETP) for transmitting processed information between SGW 402 and ESS 404. Alternatively, the interface 412 may employ standards-based protocols such as Simple Mail Transfer Protocol (SMTP) or an Extended Markup Language (XML)-based protocol. Reference numeral 414 refers to exemplary signaling path via IMS 120 between SGW 302 and Service Client (SC) software 415 executing on MCD 116, effectuated using SIP. Reference numeral 416 refers to the message flow path between MCD 116 and SGW 402 for transmitting the redirected data items. Interface 418 is a standard email application interface that allows interaction between user 420 and MCD 116, wherein the received data items may be presented, new data items may be created, or reply messages may be generated.

To facilitate routing, the IMS administrative domain relies on a set of Initial Filter Criteria (IFC) when an S-CSCF node in the IMS layer 350B is mapped to a corresponding SGW and associated ESS. The routing rules to find and/or assign a suitable ESS may be embedded in the IFC provisioned by either the network operator or the service provider. The information may be deployed in an HSS database statically, wherein an assigned S-CSCF node is operable to download the IFC from the HSS when a subscriber's UE (e.g., MCD 116) registers.

It will be realized that the embodiment illustrated in FIG. 4 is exemplary of email service delivery in a session messaging mode wherein a separate media channel (e.g., message flow path 416) is provided. Alternatively, email service delivery may also be effectuated in a page mode (also referred to as immediate messaging mode) wherein the redirected data item information is carried within a signaling channel (e.g., signaling flow path 414).

Figure 5:
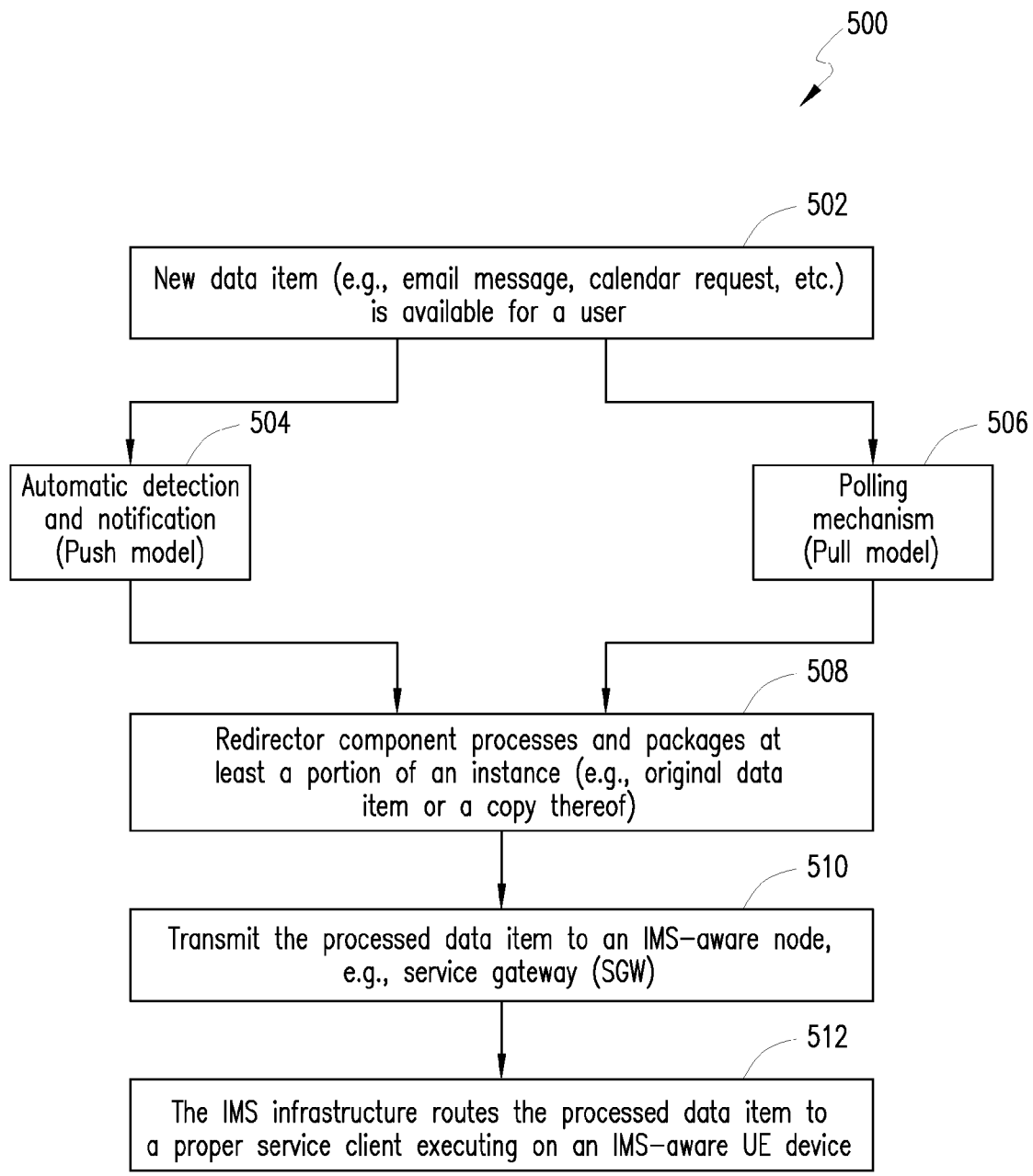
FIG. 5 depicts a flowchart associated with one or more exemplary embodiments of the present patent disclosure for effectuating delivery of data items over IMS.

FIG. 5 depicts a flowchart associated with one or more exemplary embodiments of the present patent disclosure for effectuating delivery of data items over IMS. At block 502, a new data item (e.g., email message, calendar request, etc.) is available for a user, either at the user's standalone desktop computer, user's networked computer in a LAN, or at a host/server system in an enterprise network. In a further variation, the data items may be available at an Internet mailbox associated with the user, typically hosted by an Internet Service Provider (ISP), for example, as described in the co-pending commonly assigned U.S. patent application Ser. No. 10/671, 162 (filed: Sep. 25, 2003), entitled "SYSTEM AND METHOD FOR PUSHING INFORMATION FROM A HOST SYSTEM TO A MOBILE DATA COMMUNICATION DEVICE," now published as U.S. Patent Application Publication No. 2004/0073619, in the names of: Barry J. Gilhuly, Anh Ngoc Van, Steven M. Rahn, Gary P. Mousseau and Mihal Lazaridis, incorporated by reference herein. Regardless of where the data items are available, the new data item may be automatically detected (block 504) or by means of a polling mechanism (block 506). A redirector component processes and packages at least a portion of an instance (i.e., the original data item or a copy thereof) into processed information, including adding address information relating to the user's MCD (block 508). The processed information is then transmitted to an IMS-aware node, e.g., RSS service gateway (SGW) (block 510), whereby the processed information is delivered over the IMS network to a proper service client executing on the user's MCD that is accessible via an access network (block 512).

Figure 6:
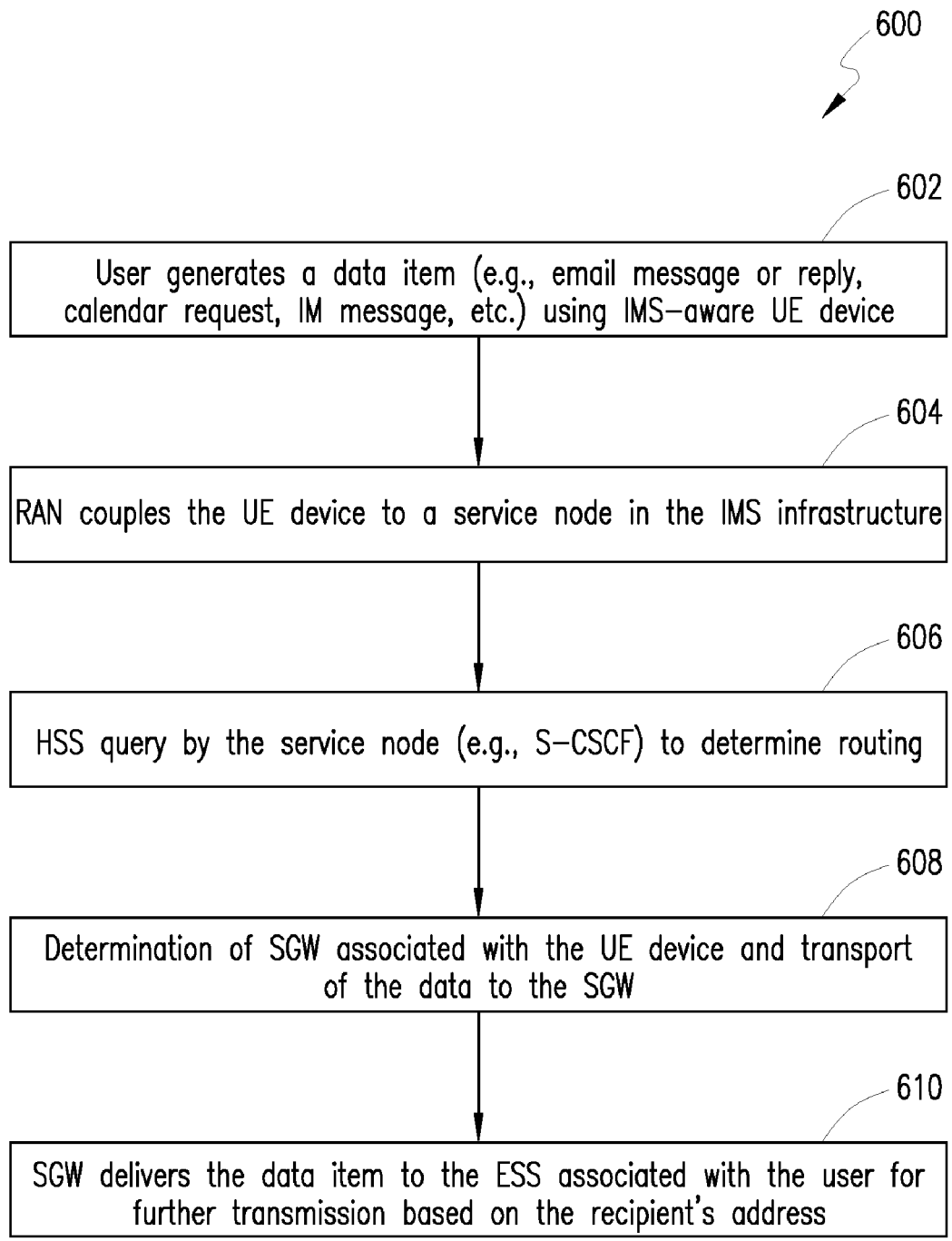
FIG. 6 depicts a flowchart associated with one or more exemplary embodiments of the present patent disclosure for effectuating delivery of a data item from an IMS-aware mobile communications device.

FIG. 6 depicts a flowchart associated with one or more exemplary embodiments of the present patent disclosure for effectuating delivery of a data item from an IMS-aware mobile communications device such as, e.g., MCD 116 shown in FIG. 1. An authorized user generates a data item (e.g., a new email message or a reply to a received message, a calendar request, or an IM message, etc.) using appropriate application software executing on MCD 116, whereupon the SC component executing thereon processes and packages the data item for delivery via IMS (block 602). A suitable RAN couples MCD 116 to a service node in the IMS infrastructure (block 604), wherein the service node or its component (e.g., S-CSCF) queries an HSS node associated with the user's home network to determine routing (block 606). Address information relating to the SGW that is associated with the user's MCD and ESS is determined, whereupon the data item is transported to the SGW using either page mode or session messaging mode (block 608). The SGW thereafter delivers the data item to the ESS associated with the user for further transmission based upon intended recipient's address (block 610).

The IMS delivery model described in FIG. 4 for redirecting data items is relatively simple and straightforward to implement in a number of different network environments. It will be realized, however, that since an assigned S-CSCF node is operable to determine routing information that is static (as embedded within the IFC that populate an HSS database), the IMS administrative domain is not capable of dynamically and intelligently monitor and adjust a transmission path between the ESS and a UE device based on the current runtime circumstances of the ESS in order to maintain a reliable service path. In other words, reliance on the use of the static bindings provisioned via the IFC to reach a destined ESS directly may cause reliability and scalability issues in certain network implementations.

Figure 7:
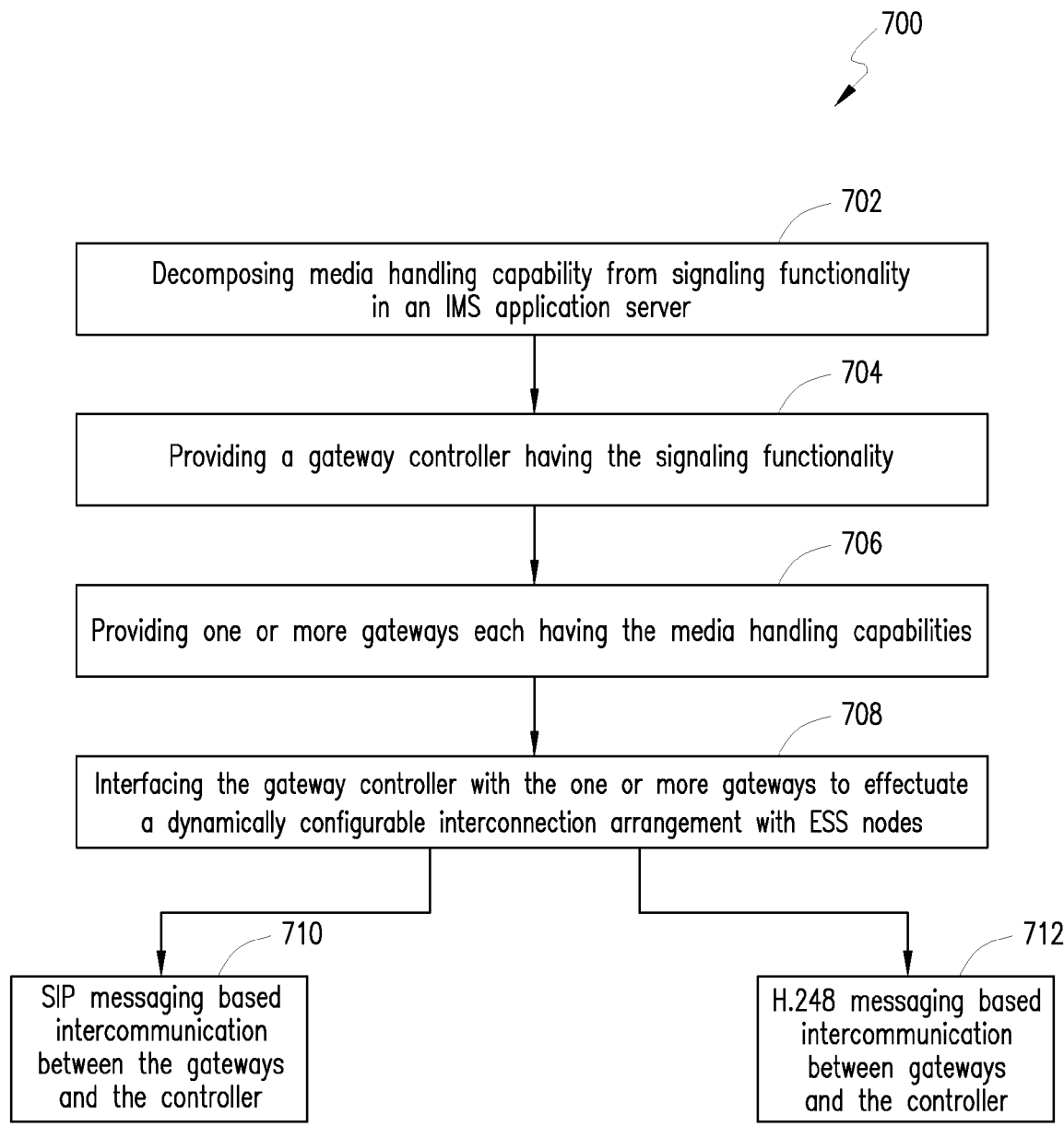
FIG. 7 depicts a flowchart relating to a service gateway decomposition scheme according to one embodiment.

FIG. 7 depicts a flowchart relating to a service gateway decomposition scheme 700 according to one embodiment wherein scalability and reliability concerns may be advantageously addressed. The decomposition scheme 700 involves decomposing media handling capability from signaling functionality of a full SGW node such as SGW 402 illustrated in FIG. 4, whereby a number of "thin" SGW nodes are controlled by a controller entity of an IMS network (block 702). One or more gateway controllers that are logically seen as a single controller node may be provided for embodying the signaling flow functionality (block 704). A number of SGW nodes may be provisioned in a scalable arrangement, each having media handling capabilities (block 706). The gateway controller is interfaced with the gateways to effectuate a dynamically configurable interconnection arrangement between the SGWs and ESS nodes (block 708). Essentially, the functionality of the gateway controller includes monitoring and communicating with the SGWs, wherein the ESS nodes and SCs connect to and consult the gateway controller to obtain and use suitable and reliable SGW nodes for service delivery. As illustrated, the communications between the SGW nodes and the gateway controller may be effectuated using SIP messaging (block 710), or alternatively, H.248-based messaging (block 712).

Figure 8:
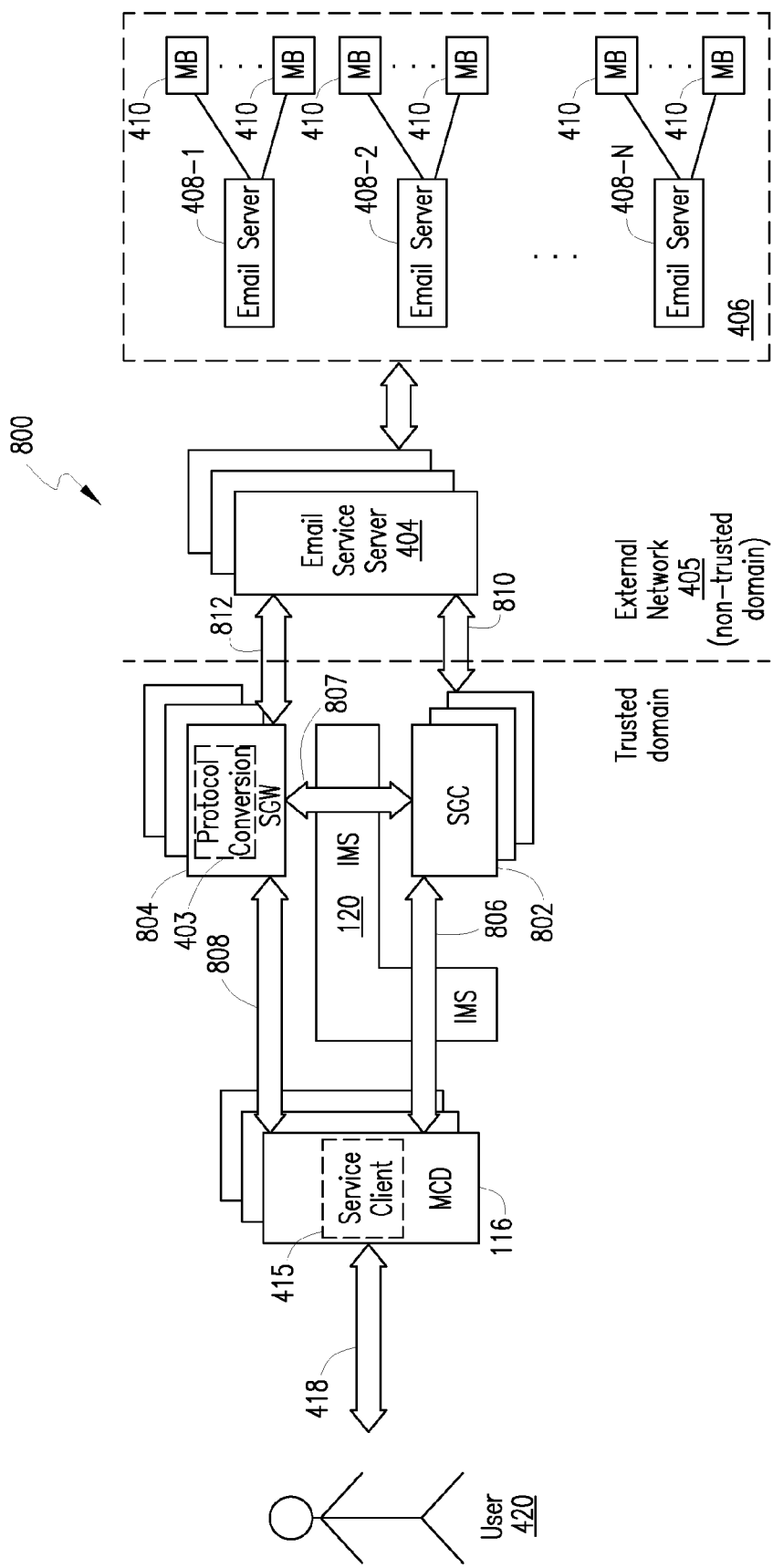
FIG. 8 depicts a network architectural embodiment for facilitating delivery of data items over IMS wherein service gateway functionality is decomposed in accordance with the teachings of the present patent disclosure.

FIG. 8 depicts a network architectural embodiment 800 for facilitating delivery of data items over IMS wherein service gateway functionality is decomposed in accordance with the teachings set forth herein. As exemplified, external network 405 in this FIGURE is the same as the non-trusted domain depicted in FIG. 4 with respect to the non-decomposed SGW embodiment. One or more service gateway controllers (SGCs) 802 are interfaced with ESS 404 with respect to effectuating a signaling flow interface 810. Interface 812 is operable to effectuate media/message transport flow in a first protocol, which may be standards-based or proprietary as discussed previously, between ESS 404 and one or more SGWs 804. As before, appropriate protocol conversion/translation 403 is provided as part of the SGW functionality for handling the media/message transport in a second protocol via a network pathway 808 to SC 415 executing on one or more MCDs 116. Because of the service gateway decomposition, two separate signaling flow paths are necessary: a signaling flow path 806 between SGCs 802 and SC 415 on MCDs 116 and another signaling flow path 807 between SGCs 802 and SGWs 804. Whereas the signaling flow path 806 is effectuated using IMS's SIP-based signaling, an implementer has a choice with respect to the signaling protocol used for the flow path 807. In one implementation, H.248/Megaco protocol may be used as the signaling communication protocol relative to the flow path 807. Alternatively, Media Gateway Control Protocol or MGCP may be used in another implementation as the signaling communication protocol between SGCs 802 and SGWs 804. In a still further variation, illustrated in FIG. 8, IMS's SIP signaling may be extended so that the communication between SGCs 802 and SGWs 804 may also be SIP-based. In this embodiment, accordingly, both SGC functionalities 802 as well as SGW functionalities 804 are deployed as IMS entities (i.e., AS nodes) wherein the service network arrangement coupling these components becomes an extension of the IMS infrastructure. Accordingly, such an arrangement may afford the advantage of IMS's management capabilities such as, e.g., security, charging, reliability, etc. extended even to the service network environment. Further, it should be appreciated that if the service network disposed between SGCs 802 and SGWs 804 becomes integrated within the IMS infrastructure, the SGC and SGW nodes can inherit all IMS entity characteristics and be seamlessly managed by the IMS administrative domain. In addition, it is relatively more straightforward to interconnect with other IMS networks when service requirements such as, e.g., roaming come into play.

On the other hand, implementing H.248 as the signaling protocol for the service network between SGCs 802 and SGWs 804 does not allow the service network to become part of the IMS infrastructure inasmuch as the SGW nodes 804 are logically IMS-independent entities and as such exist outside the IMS administrative domain. However, in a further variation, the H.248/Megaco signaling communication may be adapted to run over SIP, wherein an H.248 context will be treated as a SIP extension that allows integration between H.248 and SIP.

Figure 9:
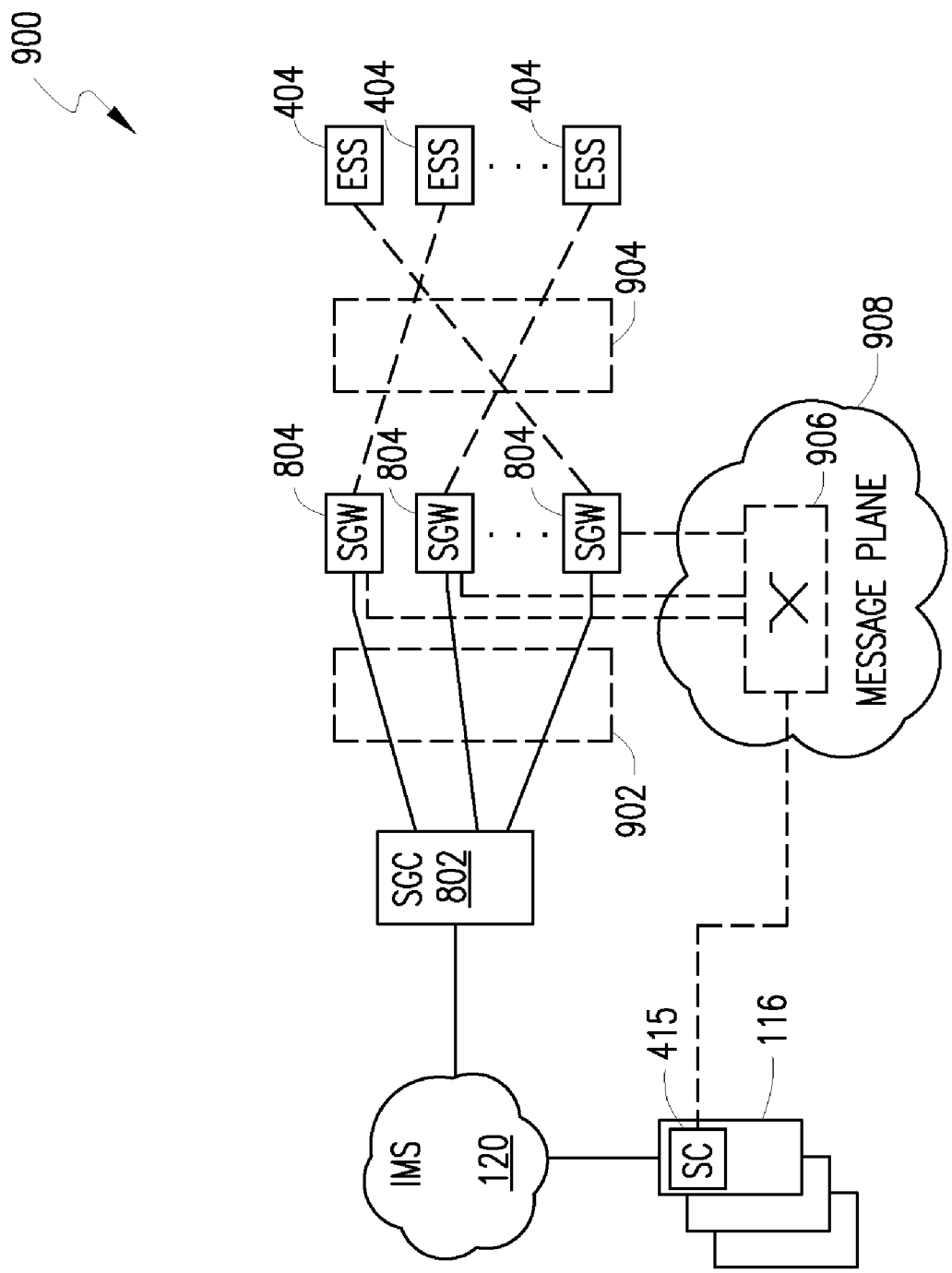
FIG. 9 depicts a network communications environment exemplifying service gateway decomposition according to one embodiment.

FIG. 9 depicts a network communications environment 900 that illustrates a service network system 902 involving SGC 802 and SGWs 804. Additionally, the network communications environment 900 is illustrative of a dynamically configurable routing arrangement 904 between SGWs 804 and ESS nodes 404 at one end of the environment 900 as well as a dynamically configurable routing arrangement 906 between SCs 415 and SGWs 804 with respect to IMS's message plane 908. It will be realized that although there may exist multiple SGCs based on a priority policy configured in an IMS node (i.e., HSS) with respect to a particular service delivery (e.g., delivery of redirected email), logically they are operable as a single centralized SGC, e.g., SGC 802, having a fixed and well known SIP URI, host/service (or resource) name, or a Fully Qualified Domain Name (FQDN), and/or an IP address, which could be accessed by the external entities such as ESS nodes 404 and SCs 415 operating on respective MCDs 116. In general operation, SC 415 or ESS 404 contacts SGC 802 using the IMS signaling plane to discover a suitable SGW. Responsive thereto, SGC 802 is operable to assign a particular SGW to SC 415 or ESS 404. SC 415 establishes a messaging session with the assigned SGW 804 that is already connected to a particular ESS 404 with which SC 415 is associated. Alternatively, SGC 802 may interrogate a target ESS (i.e., the ESS with which SC 415 is configured to communicate) to connect to the assigned SGW 804. Once the end-to-end path is established between SC 415 and the target ESS 404, SC 415 may then receive the redirected data items as processed information from ESS 404 via the particular SGW 404 assigned to the current messaging session. In order to maintain reliability and scalability, SGC 802 may dynamically alter the assignment of SGWs 804 with respect to the various sessions between SCs 415 and ESS nodes 404 that may be going on at any one time. In other words, routing connection arrangement 904 between SGWs 804 and ESS nodes 404 may be reassigned by SGC 802 such that an end-to-end message flow path between a particular SC 415 and the associated target ESS 404 may be mediated by different SGWs at different times. Likewise, routing connection arrangement 906 that illustrates routing on the message plane 908 of the network environment 900 between SCs 415 and SGWs 804 may also be dynamically managed to further improve the overall reliability and scalability of the service architecture. Additionally, since the signaling and messaging planes are separated due to the service gateway decomposition, the service model illustrated in FIGS. 8 and 9 also provides protection against possible interference between the two planes, which in turn helps to improve scalability.

Figure 10:
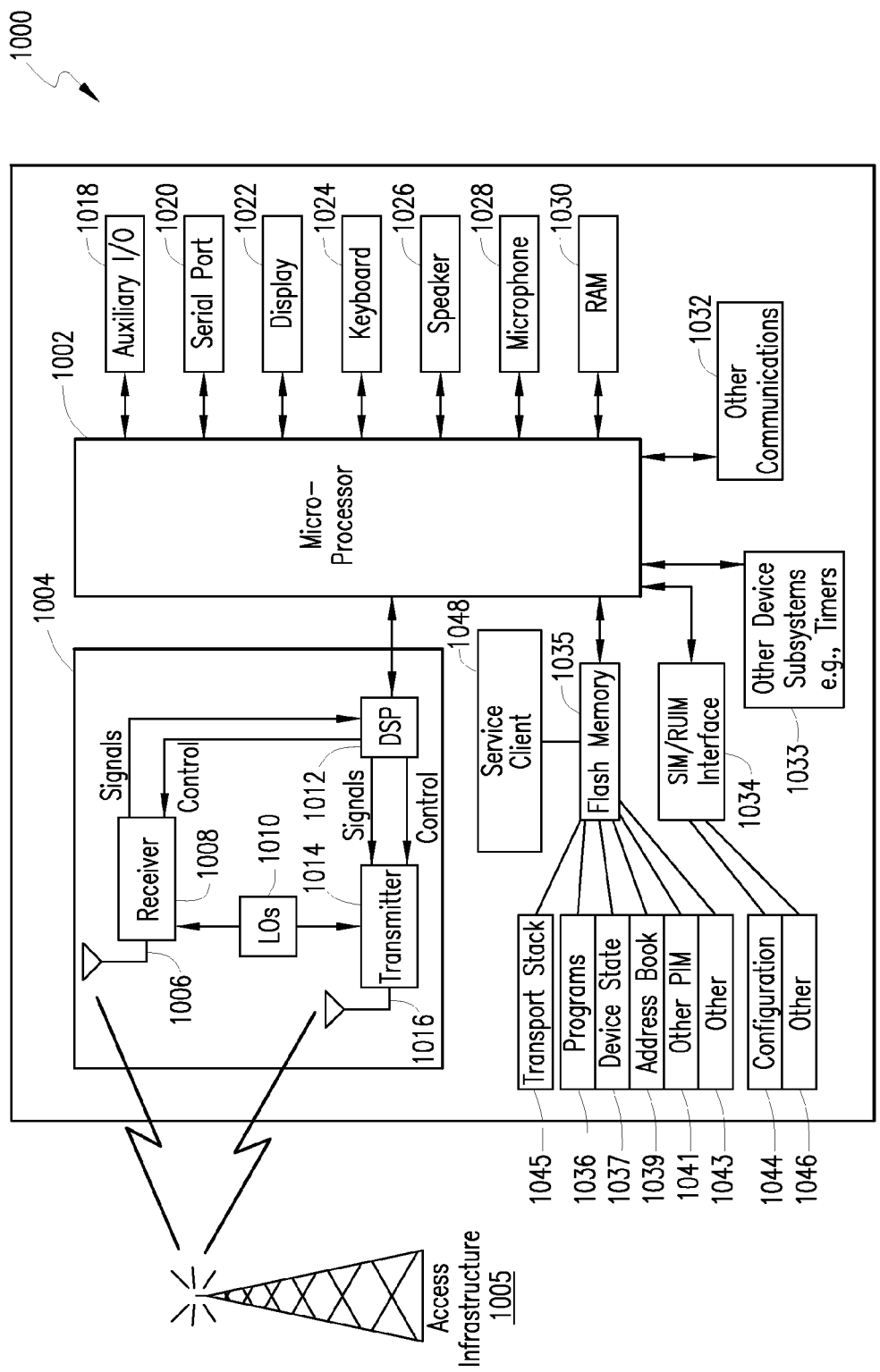
FIG. 10 depicts a block diagram of an embodiment of a communications device operable for purposes of the present patent disclosure.

FIG. 10 depicts a block diagram of an embodiment of a user equipment (UE) device 1000 operable as, e.g., MCD 116, for purposes of the present patent disclosure. It will be recognized by those skilled in the art upon reference hereto that although an embodiment of MCD 116 may comprise an arrangement similar to one shown in FIG. 10, there can be a number of variations and modifications, in hardware, software or firmware, with respect to the various modules depicted. Further, UE device 1000 for purposes of the present disclosure may comprise a mobile equipment (ME) device without a removable storage module and/or a mobile device coupled with such a storage module. Accordingly, the arrangement of FIG. 10 should be taken as illustrative rather than limiting with respect to the embodiments of the present patent application. A microprocessor 1002 providing for the overall control of UE 1000 is operably coupled to a communication subsystem 1004 that may preferably be capable of multi-mode communications (e.g., CS domain and PS domain). The communication subsystem 1004 generally includes one or more receivers 1008 and one or more transmitters 1014 as well as associated components such as one or more local oscillator (LO) modules 1010 and a processing module such as a digital signal processor (DSP) 1012. As will be apparent to those skilled in the field of communications, the particular design of the communication module 1004 may be dependent upon the communications networks with which the mobile device is intended to operate (e.g., a CDMA network, a GSM network, WLAN, et cetera). Regardless of the particular design, however, signals received by antenna 1006 through appropriate access infrastructure 1005 (e.g., cellular base station towers, WLAN hot spots, etc.) are provided to receiver 1008, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 1012, and provided to transmitter 1014 for digital-to-analog (D/A) conversion, frequency up conversion, filtering, amplification and transmission over the air-radio interface via antenna 1016.

Microprocessor 1002 may also interface with further device subsystems such as auxiliary input/output (I/O) 1018, serial port 1020, display 1022, keyboard/keypad 1024, speaker 1026, microphone 1028, random access memory (RAM) 1030, a short-range communications subsystem 1032, and any other device subsystems, e.g., timer mechanisms, generally labeled as reference numeral 1033. To control access, an interface 1034 operable with a Universal Subscriber Identity Module or Removable User Identity Module (USIM/RUIM) may also be provided in communication with the microprocessor 1002. In one implementation, USIM/RUIM interface 1034 is operable with a USIM/RUIM card having a number of key configurations 1044 and other information 1046 such as identification and subscriber-related data.

Operating system software and applicable service logic software may be embodied in a persistent storage module (i.e., non-volatile storage) such as Flash memory 1035. In one implementation, Flash memory 1035 may be segregated into different areas, e.g., storage area for computer programs 1036 (e.g., service processing logic), as well as data storage regions such as device state 1037, address book 1039, other personal information manager (PIM) data 1041, and other data storage areas generally labeled as reference numeral 1043. A transport stack 1045 may be provided to effectuate one or more appropriate radio-packet transport protocols. In addition, service client logic 1048 operable to effectuate signaling and message pathways with respect to delivery and processing of redirected data items is also provided. It should be appreciated that the various operations set forth herein, either on the UE device side, ESS side, or on the IMS SGC/SGW side, may be accomplished via a number of means, including software (e.g., program code), firmware, hardware, or in any combination, usually in association with a processing system. Where the processes are embodied in software, such software may comprise program instructions that form a computer program product, instructions on a computer readable medium, uploadable service application software, or software downloadable from a remote station, and the like.

Accordingly, in one exemplary embodiment, the structure and functionality of UE device 1000 may comprise one or more of the following: means for contacting an SGC disposed in an IMS network by SC 1048 executing thereon, wherein the SGC is operably coupled to a plurality of service gateways (SGWs); means for discovering a particular SGW assigned with respect to SC 1048 on wireless UE device 1000; and means for receiving from the particular SGW one or more data items redirected to the wireless UE device by a remote services server associated therewith.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A service network system adapted to interoperate in an Internet Protocol (IP) Multimedia Subsystem (IMS) environment, said service network system comprising:
    a service gateway controller (SGC) operable to effectuate a signaling interface with respect to at least one remote services server; and
    a plurality of service gateways (SGWs) operably coupled to said SGC for effectuating a message transport interface that is decoupled from said signaling interface of said service gateway controller (SGC), wherein said SGC includes functionality for altering assignment of a particular SGW from said plurality of SGWs with respect to a current message session between said at least one remote services server and a user equipment (UE) device in order to dynamically adjust a transmission path therebetween for said current message session via another SGW selected from said plurality of SGWs, wherein said current message session is effectuated for transmission of one or more data items between said UE device and said at least one remote services server, said one or more data items comprising at least one of an email message, a calendar event, a meeting notification, an address entry, a journal entry, a personal reminder, an Instant Message (IM), and a notification from an external network.

2. The service network system as recited in claim 1, wherein each of said plurality of SGWs includes means for converting a data item received from said remote services server in a first protocol into message information in a second protocol.

3. The service network system as recited in claim 2, wherein said data item comprises one of an email message, a calendar event, a meeting notification, an address entry, a journal entry, a personal reminder, an Instant Message (IM), and a notification from an external network.

4. The service network system as recited in claim 1, wherein said SGC comprises a network node addressable using a Session Initiation Protocol (SIP) Uniform Resource Identifier (URI).

5. The service network system as recited in claim 1, wherein said SGC comprises a network node addressable using a resource name.

6. The service network system as recited in claim 1, wherein said SGC comprises a network node addressable using an Internet Protocol (IP) address.

7. The service network system as recited in claim 1, wherein said SGC comprises a network node addressable using a host name.

8. The service network system as recited in claim 1, wherein said SGC comprises a network node addressable using a service name.

9. The service network system as recited in claim 1, wherein said SGC comprises a logically centralized SGC representing a plurality of SGCs.

10. A method of routing communication in an Internet Protocol (IP) Multimedia Subsystem (IMS) network, said method comprising:
    assigning a particular service gateway (SGW) to a service client (SC) executing on a user equipment (UE) device, said particular SGW selected from a plurality of service gateways (SGWs) that are adapted for effectuating a message transport interface decoupled from a signaling interface of a service gateway controller (SGC);
    establishing an end-to-end transmission path between said UE device and a remote services server associated therewith via said particular SGW for effectuating a current message session;
    monitoring said end-to-end transmission path; and
    dynamically adjusting said end-to-end transmission path for said current message session via another SGW selected from said plurality of SGWs, wherein said current message session is effectuated for transmission of one or more data items between said UE device and said remote services server, said one or more data items comprising at least one of an email message, a calendar event, a meeting notification, an address entry, a journal entry, a personal reminder, an Instant Message (IM), and a notification from an external network.

11. The method as recited in claim 10, further includes monitoring runtime characteristics of said remote services server.

12. The method as recited in claim 10, wherein at least one of said particular SGW and said another SGW is adapted to operate with H.248 protocol.

13. The method as recited in claim 10, wherein at least one of said particular SGW and said another SGW is adapted to operate with Media Gateway Control Protocol.

14. The method as recited in claim 10, wherein at least one of said particular SGW and said another SGW is adapted to operate with Session Initiation Protocol.

* * * * *